W. W. THIEDE.
ADJUSTABLE BEARING.
APPLICATION FILED MAR. 29, 1921.
1,409,260.
Patented Mar. 14, 1922.
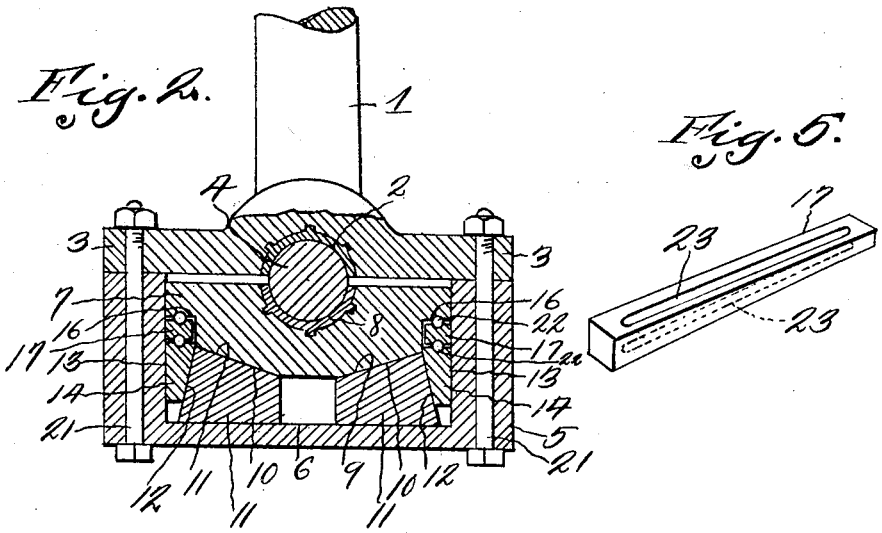
Fig. 2.
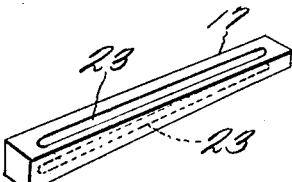
Fig. 5.
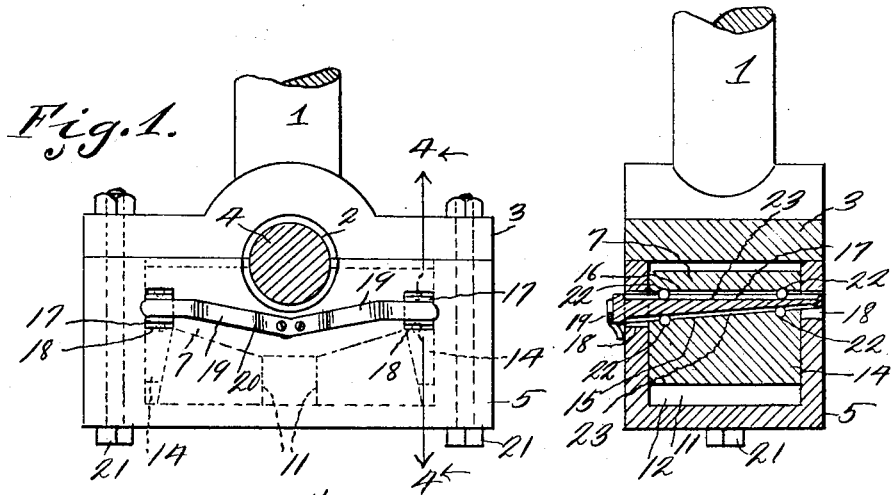
Fig. 1.
Fig. 4.
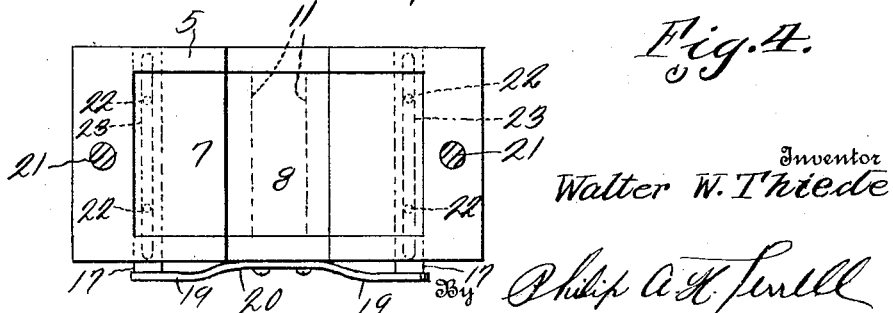
Fig. 3.
Inventor
Walter W. Thiede
By Philip A. H. Serell
his Attorney

UNITED STATES PATENT OFFICE.

WALTER W. THIEDE, OF AMHERST, NEBRASKA.

ADJUSTABLE BEARING.

1,409,260.

Specification of Letters Patent. Patented Mar. 14, 1922.

Application filed March 29, 1921. Serial No. 456,734.

*To all whom it may concern:*

Be it known that WALTER W. THIEDE, citizen of the United States, residing at Amherst, in the county of Buffalo and State of Nebraska, has invented certain new and useful Improvements in Adjustable Bearings, of which the following is a specification, reference being had therein to the accompanying drawing.

The invention relates to adjustable bearings of a type wherein the bearing will automatically be adjusted incident to wear, thereby maintaining properly adjusted bearings at all times, and obviating the necessity of constant adjustment of the bearing to take up looseness in the bearing and prevent knocking.

A further object is to provide adjustable bearings, particularly adapted for use in connection with crank shafts and to provide a bearing block which bearing block has vertically movable therein a block for engaging the crank bearing, said vertically movable block having disposed thereunder within the bearing block chamber wedge shaped blocks which engage bevelled surfaces on the under face of the vertically movable block and adapted to be forced inwardly for moving the vertically movable block upwardly for taking up wear thereon. Also to provide vertically disposed wedge shaped blocks cooperating with bevelled surfaces on the wedge shaped blocks disposed beneath the vertically movable block, said vertically disposed wedge shaped blocks having disposed above the same tapered transversely disposed keys, which keys are normally forced inwardly by leaf springs, and cooperate with inclined surfaces on the upper sides of the vertically disposed wedge shaped blocks and surfaces on the vertically movable block.

A further object is to provide ball bearings for the wedge shaped blocks, thereby insuring easy movement of the wedge shaped keys.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the adjustable bearing.

Figure 2 is a vertical longitudinal sectional view through the adjustable bearing.

Figure 3 is a top plan view of the lower bearing block.

Figure 4 is a vertical sectional view taken on line 4—4 of Figure 1.

Figure 5 is a perspective view of one of the tapered keys.

Referring to the drawings, the numeral 1 designates a connecting rod, the lower end of which terminates in a semi-circular recess 2 and outwardlly extending ears 3. Disposed within the recess 2 is a conventional form of crank 4, which crank is operated by the connecting rod 1. Disposed beneath the crank 4 is a bearing casing 5, which casing is provided with a rectangular shaped chamber 6, in which chamber is vertically movable a bearing block 7 having a semi-circular recess 8 therein which engages the crank 4, and in connection with the similarly shaped recess 2 carried by the connecting rod 1 forms a bearing for the crank 4 to rotate in. The under face of the bearing block 7 is provided with downwardly and inwardly inclined surfaces 9, with which surfaces the bevelled surfaces 10 of wedge blocks 11 cooperate. The wedge blocks 11 are disposed in the chamber 6 and are adapted to be forced inwardly toward each other and force the bearing block 7 upwardly to take up the wear on the bearing 8 or bearing 2. Interposed between the downwardly and outwardly extending inclined surfaces 12 of the wedge blocks 11 and the vertical walls 13, of the chambers 6 are transversely disposed wedge blocks 14, which blocks when forced downwardly force the wedge blocks 11 inwardly for forcing the bearing blocks 7 upwardly and taking up the wear in the bearing. The upper faces of the vertically disposed wedge blocks 14 are inclined as shown at 15 and interposed between said inclined faces and horizontally disposed faces 16 of the ends of the bearing block 7 are tapered keys 17, which keys extend transversely through apertures 18 in the side walls of the casing 5 and are forced inwardly at all times by means of spring arms 19 of a leaf spring 20 which is secured to the casing 5. It will be seen that a constant inward pressure is exerted on the tapered keys 17 at all times and that the action will force the vertically disposed wedge blocks 14 downwardly and consequently force the wedge blocks 11 inwardly, which wedge blocks will in turn force the bearing 7 upwardly, thereby taking up the wear on the bearing as a whole. It will be seen that the bearing is self adjusting and that the wear will be taken up as it occurs, thereby eliminating knocking and causing the parts to run true at all times.

The casing 5 is secured to the connecting rod by means of bolts 21 which pass through apertures in the casing and through apertures in the ears 3 of the connecting rod. To reduce the friction between the tapered keys 17 and the inclined surfaces 15 of the vertically disposed wedge blocks 14 and the horizontal surfaces 16 of the bearing block 7, ball bearings 22 are disposed in recesses of said surfaces 15 and 16, which ball bearings are also disposed in longitudinally disposed raceways 23 in the tapered keys, and by means of which ball bearings the friction is reduced to a minimum thereby allowing the spring arms 19 to easily force said keys inwardly and move the various wedging blocks.

From the above it will be seen that a self adjusting bearing is provided, wherein the wear on the bearing will be taken up as it develops and one wherein the parts are reduced to a minimum and the operation is positive.

For purposes of illustration the device has been shown in connection with the crank of a crank shaft, however, it is to be understood that the adjustable bearing may be used wherever desired in machinery.

The invention having been set forth what is claimed as new and useful is:—

1. The combination with a connecting rod having a semi-circular bearing therein and a crank disposed in said bearing, a casing carried by said connecting rod and disposed beneath the crank and having a chamber therein, a bearing block vertically movable in the chamber of said casing, horizontally disposed wedge blocks disposed within the casing and cooperating with bevelled faces on the under side of the vertically movable bearing blocks, vertically disposed wedge blocks interposed between the outer ends of the horizontally disposed wedge blocks and forming means for forcing said horizontally disposed wedge blocks inwardly, transversely disposed tapered keys extending through the casing and interposed between inclined surfaces of the vertically disposed wedge blocks and straight surfaces of the bearing block, spring means for normally forcing the tapered keys inwardly and antifrictional bearings for said tapered keys.

2. The combination with a connecting rod having a semi-circular bearing therein and a crank disposed in said bearing, of an adjustable bearing for said crank, said adjustable bearing comprising a casing carried by the connecting rod and disposed beneath the crank and having a chamber therein, a vertically movable bearing block disposed within the chamber and provided with a semicircular recess for the reception of the crank, horizontally disposed wedge blocks disposed within the chamber and engaging bevelled faces on the under side of the vertically movable bearing block, vertically disposed wedge blocks interposed between the ends of the horizontally disposed blocks and the ends of the chamber, tapered keys extending transversely through the casing and interposed between inclined faces of the vertically disposed wedge blocks and straight faces of the bearing blocks, said tapered keys being provided with longitudinally disposed raceways, ball bearings disposed in said raceways and in recesses in the upper faces of the vertically disposed wedge blocks and the straight faces of the bearing block, and springs engaging the outer thickened ends of the tapered keys for forcing said keys inwardly.

In testimony whereof I hereunto affix my signature.

WALTER W. THIEDE.